United States Patent [19]

Schaschel

[11] 3,907,747

[45] Sept. 23, 1975

[54] REACTION PRODUCTS OF SILICON MONOXIDE AND CONJUGATED DIENES AND METHODS OF MAKING THE SAME

[75] Inventor: Erich T. Schaschel, Toledo, Ohio

[73] Assignee: Owens-Illinois, Inc., Toledo, Ohio

[22] Filed: July 19, 1971

[21] Appl. No.: 164,029

Related U.S. Application Data

[63] Continuation of Ser. No. 16,235, March 3, 1970, abandoned.

[52] U.S. Cl............ 260/46.5 R; 260/2 S; 260/37 SB; 260/46.5 U; 260/42.46; 260/46.5 P; 260/448.2 E; 260/448.2 Q; 260/825
[51] Int. Cl.²........................................ C08G 77/04
[58] Field of Search..... 260/94.2 R, 46.5 R, 46.5 U, 260/46.5 P, 448.2 Q, 448.2 E, 2 S

[56] References Cited

UNITED STATES PATENTS

| 3,592,834 | 7/1971 | Buckman et al............. 260/448.8 A |
| 3,624,014 | 11/1971 | Moore et al....................... 260/18 S |

Primary Examiner—Melvyn I. Marquis
Attorney, Agent, or Firm—Richard D. Heberling; E. J. Holler

[57] ABSTRACT

Organo silicon polymers are prepared by the addition reaction of silicon monoxide to conjugated dienes such as 2,3-dimethyl-1,3-butadiene. The polymers are useful in coating compositions, for fillers in plastic and ceramic compositions, and as stop-cock greases.

10 Claims, No Drawings

REACTION PRODUCTS OF SILICON MONOXIDE AND CONJUGATED DIENES AND METHODS OF MAKING THE SAME

This is a continuation of Application Ser. No. 16,235, filed Mar. 3, 1970, now abandoned.

THE INVENTION

This invention relates to organo silicon polymers prepared by reacting silicon monoxide with conjugated dienes and to methods of preparing the same.

It is an object of the present invention to provide organo silicon polymers by reacting silicon monoxide with conjugated dienes such as 1,3-butadiene.

It is an object of the present invention to provide methods of making organo silicon polymers by reacting silicon monoxide with conjugated dienes to form the resultant polymer.

It is an object of the present invention to provide organo silicon polymers which are made by mixing gaseous silicon monoxide with a conjugated diene such as 2,3-dimethyl-1,3-butadiene to form a mixture, and condensing the mixture generally at about −196° to 100°C. and preferably about −196° to −70°C. to obtain the organo silicon polymer, the reaction of the silicon monoxide and conjugated dienes apparently taking place at the surface of a cooled chamber wall to thereby precipitate the polymer thereupon.

These and other objects will be apparent from the specification that follows and from the appended claims.

The present invention provides organo silicon polymers by reaction of silicon monoxide with conjugated dienes such as 1,3-butadiene. The present invention also provides methods of making organo silicon polymers by mixing gaseous silicon monoxide with a conjugated diene under high vacuum to provide a mixture, and condensing the mixture to obtain the organo silicon polymer.

In general, the methods of the present invention involve the preparation of gaseous silicon monoxide from commercially available solid silicon monoxide (such as, for instance, sold by Union Carbide Corporation) by heating the same under high vacuum (generally about $1 \times 10^{-6}$ to $1 \times 10^{-2}$ Torr and preferably about $1 \times 10^{-5}$ to about $5 \times 10^{-5}$ Torr) to about 1,200° to 1,300°C., mixing the gaseous silicon monoxide with an excess molar amount of a conjugated diene such as 1,3-butadiene to form a mixture, and condensing the mixture to form the organo silicon polymer, the reaction apparently occurring on a cold surface of a rotatable cylinder to form the polymer thereupon. Generally the molar ratio of diene to silicon monoxide is in the range of 1.5:1 to 150:1 and preferably about 80:1 to 120:1. A large excess molar amount of diene promotes the addition reaction rather than the polymerization of SiO itself.

According to IR spectroscopy and hydrolytical decomposition data, 1,4 addition of SiO to the conjugated double bond system of 2,3-dimethyl-1,3-butadiene is found to occur as follows:

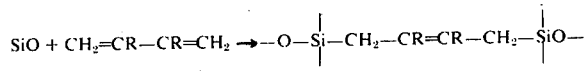

In the above equation, R is preferably an alkyl group from 1 to 10 carbon atoms. No further addition of SiO to the remaining double bond in the above-described equation in 2-butene is noticed. The 1,4 addition is in competition with the polymerization of SiO itself. The transfer from mono-coordinated silicon to tetra-coordinated silicon leads to Si-Si and Si-O-Si bridges. Thus, the reaction product usually contains Si-O-Si bonds as well as sometimes Si-Si bonds. Generally a highly cross-linked polysilanesiloxane is obtained.

Silicon monoxide can be obtained commercially and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pat. Nos. 2,882,177 and 2,823,979 which are also incorporated by reference.

Although the preferred conjugated dienes are 1,3-butadiene and 2,3-dimethyl-1,3-butadiene, other suitable conjugated dienes are dienes having the formula CHR=CR—CR=CHR in which the R is hydrogen, the same or different alkyl radical generally having 1 to 10 carbon atoms and preferably having 1 to 6 carbon atoms or an aryl group generally having 6 to 12 carbon atoms and preferably having 6 carbon atoms. In the formula, R also can include other groups such as halides, —OH and —OR. In some cases there may be a competing reaction between the conjugated diene system and substituting groups with the SiO. Suitable specific examples are isoprene, 1,3-pentadiene, 2,4-hexadiene, 1,4-diphenyl-1,3-butadiene, chloroprene, 2,4-hexadiene-1-ol and 2-ethoxy-1,3-butadiene.

The following examples are intended to illustrate the present invention and not to limit the same in any way.

EXAMPLE 2,3-dimethyl-1,3-butadiene was reacted with silicon monoxide by heating solid silicon monoxide at about 1,200° to 1,300°C. at a pressure of about 1 to $5 \times 10^{-5}$ Torr to provide gaseous silicon monoxide. The gaseous silicon monoxide was mixed with an excess of the conjugated diene (molar ratio of silicon monoxide to diene of 1:100) to form a mixture. The mixture was condensed on a surface cooled with liquid nitrogen, the surface being the walls of a rotatable cylinder, to obtain an organo silicon polymer. On warming to room temperature, the excess of unreacted 2,3-dimethyl-1,3-butadiene was pumped off and the reaction product, a white solid, with a molecular formula of $C_6H_{10}(SiO)_{1.5}$ was recovered. The reaction product was insoluble in organic solvents and infusible. The yield based on the silicon monoxide condensed onto the cold trap was 100%. The reaction product was used as a filler in plastic compositions including polyvinyl chloride compositions and organopolysiloxane compositions. The reaction product, being insoluble in organic solvents, also was used as a stop-cock grease.

In the above example, other conjugated dienes previously described as suitable can be used in place of the particular conjugated diene employed to provide substantially equivalent results.

What is claimed is:

1. A method of preparing an organo silicon polymer comprising the steps of mixing about one mole of gaseous silicon monoxide with about 1.5 to 150 moles of a conjugated diene in a vacuum at a pressure of about $1 \times 10^{-5}$ to $5 \times 10^{-5}$ Torr to form a mixture, and condensing the mixture at a temperature of about $-196°$ to $-70°C$. to provide the organo silicon polymer that is a reaction product of silicon monoxide and the conjugated diene.

2. A method as defined in claim 1 in which the conjugated diene is 2,3-dimethyl-1,3-butadiene.

3. A method as defined in claim 1 in which the conjugated diene is 1,3-butadiene.

4. A method for preparing an organo silicon polymer comprising the steps of mixing about one mole of gaseous silicon monoxide at a pressure of about $1 \times 10^{-6}$ to $1 \times 10^{-2}$ Torr with about 1.5 to 150 moles of a gaseous conjugated diene to form a mixture, condensing the mixture at a temperature of about $-196°$ to $100°C$. to provide the organo silicon polymer, the conjugated diene having the formula CHR=CR—CR=CHR where R is a member of the group consisting of hydrogen, an alkyl radical of 1 to 10 carbon atoms, an aryl radical of 6 to 12 carbon atoms, a halide, an hydroxy group, and an alkoxy group of 1 to 10 carbon atoms.

5. A method as defined in claim 4 in which the mixing is at a pressure of about $1 \times 10^{-5}$ to $5 \times 10^{-5}$ Torr and about 80 to 120 moles of the conjugated diene is used.

6. A method as defined in claim 4 in which the molar ratio of conjugated diene to silicon monoxide is about 80:1 to 120:1.

7. A method as defined in claim 4 in which the molar ratio of conjugated diene to silicon monoxide is about 100:1.

8. A method of preparing an organo silicon polymer comprising the steps of heating solid silicon monoxide to about 1,200° to 1,300°C. in a vacuum to form gaseous silicon monoxide, mixing about one mole of gaseous silicon monoxide and about 1.5 to 150 moles of a gaseous conjugated diene in a vacuum at a pressure of about $1 \times 10^{-6}$ to $1 \times 10^{-2}$ Torr to form a mixture, and condensing the mixture at a temperature of about $-196°$ to $100°C$. to obtain the organo silicon polymer having a molecular chain containing (—Si—O—Si—) units, the conjugated diene having the formula CHR=CR—CR=CHR where R is a member of the group consisting of hydrogen, an alkyl radical of 1 to 10 carbon atoms, an aryl radical of 6 to 12 carbon atoms, a halide, an hydroxy group, and an alkoxy group of 1 to 10 carbon atoms.

9. A method as defined in claim 8 in which the vacuum is a pressure of about $1 \times 10^{-5}$ to $5 \times 10^{-5}$ Torr, the condensing of the mixture is at a temperature of about $-196°$ to $-70°C$. and about 80 to 120 moles of the conjugated diene is used.

10. A method as defined in claim 4 in which the pressure is at about $1 \times 10^{-5}$ to $5 \times 10^{-5}$ Torr.

* * * * *